W. J. FINN.
AUTOMOBILE THEFT DETECTION DEVICE.
APPLICATION FILED NOV. 25, 1919.
1,335,827.
Patented Apr. 6, 1920.
2 SHEETS—SHEET 1.
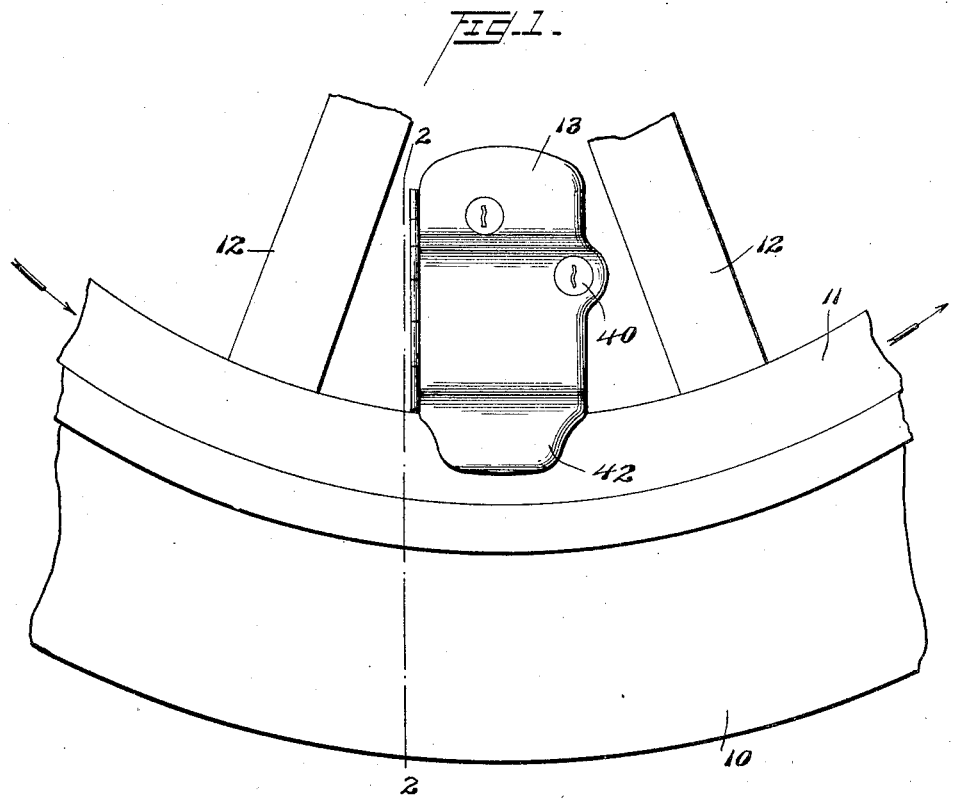
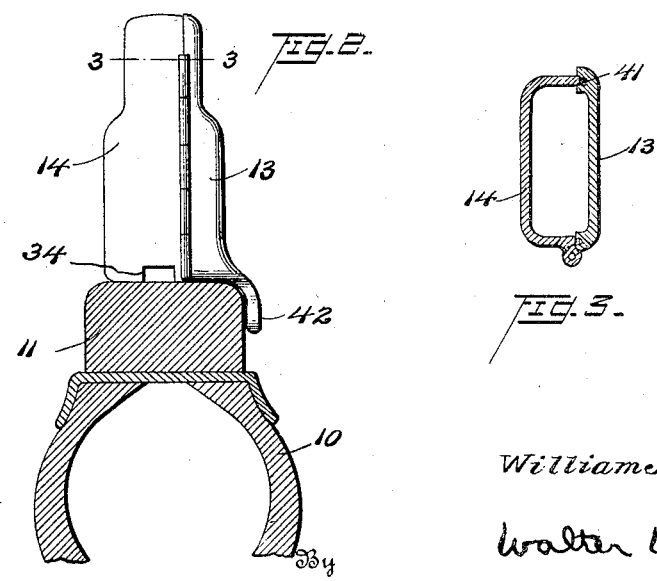
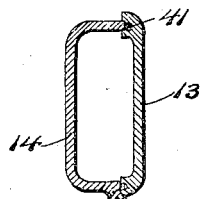
Inventor
William J. Finn
By Walter W. Burns
Attorney W. J. FINN.
AUTOMOBILE THEFT DETECTION DEVICE.
APPLICATION FILED NOV. 25, 1919.
1,335,827.
Patented Apr. 6, 1920.
2 SHEETS—SHEET 2.
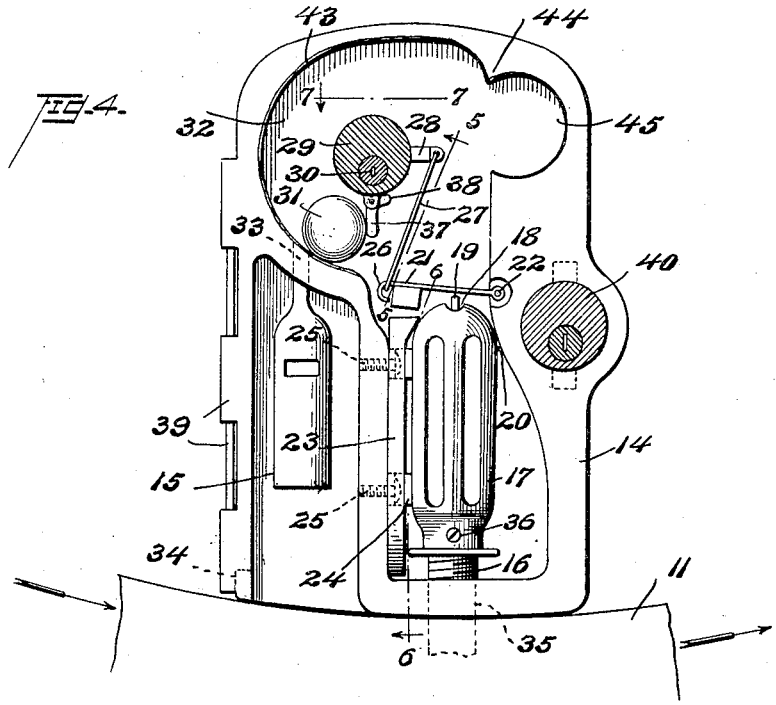
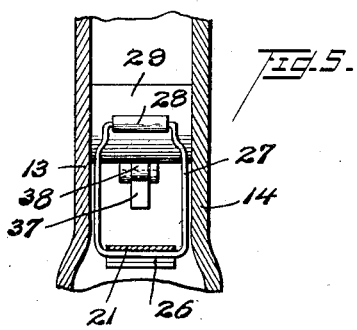
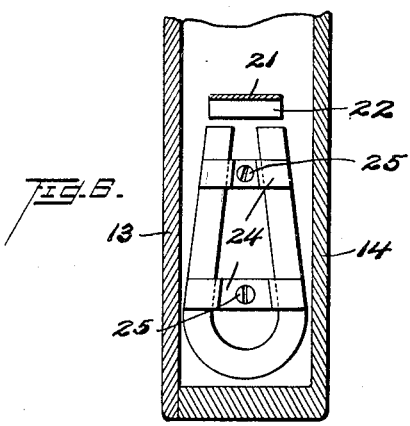
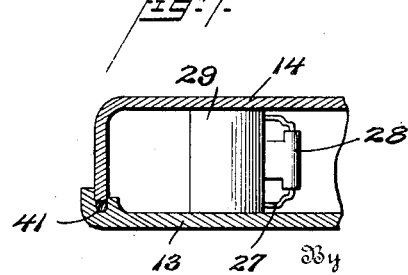
Inventor
William J. Finn
By Walter W. Burns
Attorney

UNITED STATES PATENT OFFICE.

WILLIAM J. FINN, OF WASHINGTON, DISTRICT OF COLUMBIA.

AUTOMOBILE-THEFT-DETECTION DEVICE.

1,335,827. Specification of Letters Patent. Patented Apr. 6, 1920.

Application filed November 25, 1919. Serial No. 340,475.

*To all whom it may concern:*

Be it known that I, WILLIAM J. FINN, a citizen of the United States, residing at 2512 Ontario road, Washington, D. C., have invented certain new and useful Improvements in Automobile - Theft - Detection Devices, of which the following is a specification.

The primary object of my invention is the provision of an automobile theft detection device which when attached to the valve stem of an automobile and set to operative position by the operator, will sound an alarm as soon as the automobile is moved, thus disclosing the fact that the automobile is being stolen, and will deflate the tire thus rendering high speed impossible. A further object is the provision of such a device which is controlled by a lock and key and which may be turned to the "off" position by the operator when he starts the automobile thus preventing the sounding of the alarm.

A still further object of this invention is the provision of such a device having an attaching means whereby the device may be attached securely, quickly and easily to the valve stem and of a closure means for completely inclosing the working parts of the device thus preventing injury to the working parts.

Other and further objects of the invention will hereinafter appear.

Referring now to the drawings wherein the same and like parts are designated by the same numeral in all the figures.

Figure 1 is a view of the invention as a whole, showing the same attached to the wheel of a vehicle such as an automobile.

Fig. 2 is a side view of the device attached, showing the rim and tire in section along the line 2—2 of Fig. 1.

Fig. 3 is a cross section on the line 3—3 of Fig. 2.

Fig. 4 is a view of the device attached to the valve stem and having the cover removed.

Fig. 5 is a section on the line 5—5 of Fig. 4.

Fig. 6 is a section on the line 6—6 of Fig. 4.

Fig. 7 is a fragmentary cross sectional view on the line 7—7 of Fig. 4.

Referring now particularly to Fig. 1, 10 designates the tire of an automobile; 11, the rim thereof and 12 adjacent spokes between which is located the valve stem of the tire. 13 designates the front or closure member of the device which is situated at the side of the automobile.

Referring now to the other figures, 14 designates the shell or body portion containing the working parts of the device.

The working parts of the device comprise an alarm, a means for pressing the valve stem when the wheel, to which it is attached, revolves. This permits the air to escape and causes the alarm to be sounded. Means are also provided to retain the valve opening means in depressed position, thereby maintaining a continuous sounding of the alarm until the operator has turned off the device or, as in the described embodiment, the air has been let out of the tire. Further means are provided whereby the device is prevented from operating, at the option of the operator.

In the accompanying drawings the alarm in shown as a police whistle 15 although it is to be understood that any of the well known noise making devices may be substituted as long as the air from the valve is utilized to start or operate the alarm. The valve stem is shown at 16. In the embodiment illustrated in Fig. 4, a valve cap 17 is shown having a hole 18 near the top thereof to permit the valve spindle 19 to protrude therethrough in position to be pressed downward. The cap 17, while here shown, is not necessary for the operation of the device. It does however form a stop for the casing 14 in its downward movement by bearing against the shoulder of the casing 14 at 20. Any suitable stop means may be used in place of the cap 17 and the bearing point 20.

An embodiment of the valve operating and holding means will now be described.

Above the valve spindle 19 and adjacent thereto is a lever 21 which is pivoted at 22 to the casing 14. At the opposite end of, and attached to, the lever 21 is an armature 22. Below the armature 22 is the magnet 23 which is secured to the wall of the casing 14 by the holding members 24 and their screws 25. The purpose of the magnet 23 is merely to hold the lever 21 in lowered position since the armature 22, once in contact with the magnet, will be firmly held thereby. This holds the valve open and permits the air to escape and sound the alarm until the same is turned off or until the tire is deflated. It will be observed that this holding means is merely exemplary and that many holding devices will suggest themselves to one skilled in the art.

At the end of the lever 21 adjacent the armature 22 is a turned down end 26 to hold the lever lifting bail 27 (see Figs. 4, 5 and 7) in operative relation with the lever 21. The bail 27 is held at its upper end by a bolt member 28 of the lock 29 having a key hole 30. An inspection of Fig. 4 shows clearly that when the bolt is retracted the armature end of the lever 21 is permitted to occupy a much lower position than when the bolt 28 is extended. Thus when the device is set for the "off" position, as illustrated in Fig. 4, the armature is prevented from coming in contact with the magnet, thus preventing the depression of the valve spindle 19. Ordinarily the pressure of the air on the valve and its spindle 19 is sufficient to sustain the lever 22 and its armature. In order to depress the spindle thus opening the valve, an auxiliary means is provided to overbalance the pressure of the air on the valve spindle 19. An exemplification of this means is shown by the ball 31 which is free to move in a track 32.

It is to be noted that the alarm whistle is connected to the chamber, of which the passage 32 is a part, by the opening 33. Since when the closure member 13 is put on, the interior chamber of which 32 is a part, has only one outlet—namely 33, any air which enters from the valve will necessarily have to go out through the opening 33 to the alarm whistle 15. At the bottom of the casing 14, as shown at 34 in Fig. 2, is an opening through which the sound escapes to give warning to the police and others that the automobile is being stolen.

In attaching the device, the threaded hole 35, indicated in Fig. 4, is started over the top of the valve stem 16 and screwed down. The cap 17 is also screwed over the valve stem 16 as soon as the latter extends through the wall of the casing 14. The casing 14 and the cap 17 are then screwed down together. When the cap reaches the lowermost position a set screw 36 is tightened to prevent the cap from moving. The casing is screwed down until the shoulder 20 bears on the cap or until the proper relation exists between the valve spindle 19 and the lever 21.

Pivoted to the lock member 29 is a dog 37 having a projection 38 so positioned that the ball 31 may pass from above the lever 21 through the bail, past the dog 37 into the passage 32, but may not pass in the opposite direction.

The cover or closure member 14 and the casing 13 are provided with complementary members of a separable hinge 39 which members may be separated when the closure member is open about 90°. When the parts are in place and the casing and cap properly adjusted, the closure member is applied. After the complementary members of the hinge 39 are engaged, the closure member is swung to closed position, the lock 40 locked and the device is ready for use. It will be noted that a rubber gasket 41 is shown to make the joint between the casing 14 and the closure member 13 tight.

At the bottom of the closure member 13 and projecting over the rim 11 is a projecting flange 42 as shown in Figs. 1 and 2. When the closure member is locked, this flange 41 holds the device from being turned off as long as the closure member is in place.

Inside the passage 32 may be placed a lining of suitable sound deadening material such as the rubber lining 43.

Near one end of the passage 32 is a projection 44 which serves to deflect the ball 31 down upon the lever 21 in revolving. It is to be noted that at the end of the passage 32 is a pocket 45 to receive the ball, in case the automobile stops in the position shown in Fig. 4, and the bolt 28 is extended. When revolving slowly with bolt 28 extended, if the automobile wheel stops at a place where the ball rolls out of this pocket 45, it will strike the end of the bolt 28 and continue over into the far side of the passage 32, the correlation of parts being such that it is difficult to stop the automobile at a place where the ball will rest upon the bolt 28 and operate the valve as soon as the bolt is withdrawn.

Having described the several parts of my device, I will now describe the operation of the device as a whole.

Suppose the device attached to the left wheel of an automobile with the parts as shown in Fig. 4. As the automobile wheel revolves the ball passes from one end of the passage 32 to the other. It is impossible for the ball to enter that part of the passage above the lever 21 because of the position of the lock bolt 28 and it is likewise impossible for the ball to reach the lever 21 at the side because of the obstruction of the dog 37. The result is that the ball tumbles around within the casing without performing any function.

Now let us assume the operator has stopped the automobile and desires to leave the same. His key is inserted in the keyhole 30 and turned. This withdraws the bolt 28 thus opening that part of the passage above the lever 21 and furnishing space enough for the ball 31 to pass. When the bolt 28 is withdrawn the bail 27 is lowered and the lever 21 rendered operative. Now if a thief should start the car, as soon as the wheel begins to turn, the ball 31 travels the length of the passage 32 and then falls upon the lever 21 as the device approaches the position illustrated in Fig. 4. This forces the armature and lever 21 downward. This causes the lever to force the spindle 19 downwardly thus opening the valve and permitting the air from the tire to escape.

At the same time, the armature 21 is held to the magnet 23 and even though the ball moves over behind 37 in the passage 32, the lever is held against the spindle 19 and causes a continuous flow of air therefrom. This air passes through the passage 32 and into the passage 33 to the whistle 15, thus sounding the alarm which may be that of a police whistle and calling the attention of the police and others to the theft. Meanwhile the tire is deflated and high speed of the automobile rendered impossible.

Now let us assume that the operator forgets to use his key when he returns to his car. In other words he attempts to use the automobile with the device in its "protecting" condition. The same result as with the thief occurs except that he immediately stops the car and throws the bolt 28 with his key. This places tension in the bail 27 thus raising the lever 21 and the armature 22 and stopping the flow of air. During the first revolution of the wheel the ball passes out into the passage 32 and is retained there by the dog 37 and the bolt 28. The ball 31 then remains in the passage 32 until the bolt 28 is again withdrawn.

It will thus be seen that I have provided a simple inexpensive device which when applied to an automobile affords protection against thieves and if the automobile is stolen sounds an alarm continuously until it is turned off or the tire becomes deflated.

While I describe and claim this invention in connection with an automobile, it is to be understood that it is adapted for use on any vehicle which has a pneumatic tire. It is to be further understood that while a particular embodiment of my invention is herein set forth, it is not to be considered as limited in form or dimensions to the particular showing, and it is intended to cover any construction which falls within the scope of the appended claims. For instance, the particular relation of the threaded portion 35 on the valve stem 16 when the device is in position, is not essential since it could well be higher thus avoiding the necessity of screwing down the device so far.

What I claim is:

1. An automobile theft detecting device comprising an alarm, means for attachment to the valve of an automobile tire, means external to the tire and controlled by the turning of a wheel of the automobile for sounding the alarm.

2. An automobile theft detecting device comprising an alarm, means for connecting the device to the valve of an automobile tire, means for pressing the valve stem when the wheel is revolved whereby air escapes, and air connections from the valve to the alarm to operate the latter.

3. An automobile theft detecting device comprising an alarm, means for connecting the device to the valve of an automobile tire, means for opening the valve when the wheel is revolved, whereby air escapes, means for retaining the valve in open position and air connections from the valve to the alarm to operate the latter.

4. An automobile theft detecting device comprising an alarm, means for connecting the device to the valve of an automobile tire, means controlled by the revolving of the wheel, for opening the valve thereby permitting air to escape, air connection from the valve to the alarm to operate the latter.

5. An automobile theft detecting device comprising an alarm, means for connecting the device to the valve of an automobile tire, means external to the tire and controlled by the turning of a wheel of the automobile for sounding the alarm, and means for preventing said last named means from operating.

6. An automobile theft detecting device comprising an alarm, means for connecting the device to the valve of an automobile tire, means comprising a weight for opening the tire valve when the wheel revolves.

7. An automobile theft detecting device comprising an alarm, means for connecting the device to the valve of an automobile tire, means comprising a weight for opening the tire valve when the wheel revolves, and means under control of the operator for preventing the last named means from operating.

8. An automobile theft detecting device comprising an alarm, means for connecting the device to the valve of an automobile, means comprising a weight for opening the tire valve when the wheel revolves, means for holding the valve, open, and locking mechanism under control of the operator to prevent the valve opening means from operating.

9. An automobile theft detecting device comprising an alarm, means for connecting the device to the valve of an automobile tire, means comprising a ball for opening the tire valve when the wheel rotates.

10. An automobile theft detecting device comprising an alarm, means for connecting the device to the valve of an automobile tire, means comprising a ball for opening the tire valve when the wheel rotates, and locking means under control of the operator for preventing the last named means from operating.

11. An automobile theft detecting device comprising an alarm, means for connecting the device to the valve of an automobile tire, means comprising a ball for opening the tire valve when the wheel rotates, means for holding the valve open and locking mechanism under control of the operator to prevent the valve opening means from operating.

12. An automobile theft detecting device comprising an alarm, means for connecting the device to the valve of an automobile tire, a pivotally mounted member adjacent the valve, a weight in position to be released and press against said pivoted member, means whereby the weight is released when the wheel is revolved, air connections between the valve and alarm to operate the latter.

13. An automobile theft detecting device comprising an alarm, means for connecting the device to the valve of an automobile tire, a pivotally mounted member adjacent the valve, a weight in position to be released and press against said pivoted member, means whereby the weight is released when the wheel is revolved, air connections between the valve and alarm to operate the latter, and locking mechanism under control of the operator for preventing the weight from operating to open the valve.

14. In an automobile theft detecting device comprising an alarm, means for connecting the device to the valve of an automobile tire, a pivotally mounted member adjacent the valve, a weight in position to be released and press against said pivoted member, means whereby the weight is released when the wheel is revolved, air connections between the valve and alarm to operate the latter, means for holding the valve open and locking mechanism under control of the operator to prevent the weight from operating to open the valve.

15. In an automobile theft detecting device, an alarm, means for connecting the device to the valve of an automobile tire, a pivotally mounted member adjacent the valve, a ball in position to be released and press against said pivoted member, and means whereby the ball is released when the wheel is revolved, thereby opening the valve, air connections between the valve and the alarm.

16. In an automobile theft detecting device, an alarm, means for connecting the device to the valve of an automobile tire, a pivotally mounted member adjacent the valve, a ball in position to be released and press against said pivoted member, means whereby the ball is released when the wheel is revolved, thereby opening the valve, air connections between the valve and the alarm, and locking mechanism under control of the operator for preventing the ball from operating to open the valve.

17. In an automobile theft detecting device, an alarm, means for connecting the device to the valve of an automobile tire, a pivotally mounted member adjacent the valve, a ball in position to be released and press against said pivoted member, and means whereby the ball is released when the wheel is revolved, thereby opening the valve, air connections between the valve and the alarm, means for holding the valve open and locking mechanism under control of the operator to prevent the ball from operating to open the valve.

18. An automobile theft detecting device comprising a whistle, means for attachment to the valve of an automobile tire, means external to the tire and controlled by the turning of the wheel of the automobile for sounding the alarm.

19. An automobile theft detecting device comprising a whistle, means for connecting the device to the valve of an automobile tire, means for opening the valve when the wheel is revolved, whereby air escapes, means for retaining the valve in open position and air connections from the valve to the whistle to blow the latter.

20. An automobile theft detecting device comprising means for connection to the tire valve of an automobile, mechanism outside the tire and operated by the revolving of the wheel to deflate the tire.

21. An automobile theft detecting device comprising an alarm, means for connection to the tire valve of an automobile, means outside the tire and operated by the revolving of the wheel to permit escape of air from the valve to operate the alarm and deflate the tire.

22. An automobile theft detecting device comprising a whistle, means for connection to the tire of an automobile, a lever adjacent and in position to operate the valve spindle of the tire valve, an armature on said spindle, a magnet adjacent said armature to hold the latter when operated, said device having a passage near the lever, a ball within the passage to operate the lever, locking means for preventing the ball from contacting with the lever, at the will of the operator and for raising the lever away from the magnet, means displaceable by the ball to permit the same to pass from contact with the lever into the passage but preventing its return, means for conducting air from the tire valve to the whistle when the lever is operated.

In testimony whereof I affix my signature.

WILLIAM J. FINN.